Figure 1:
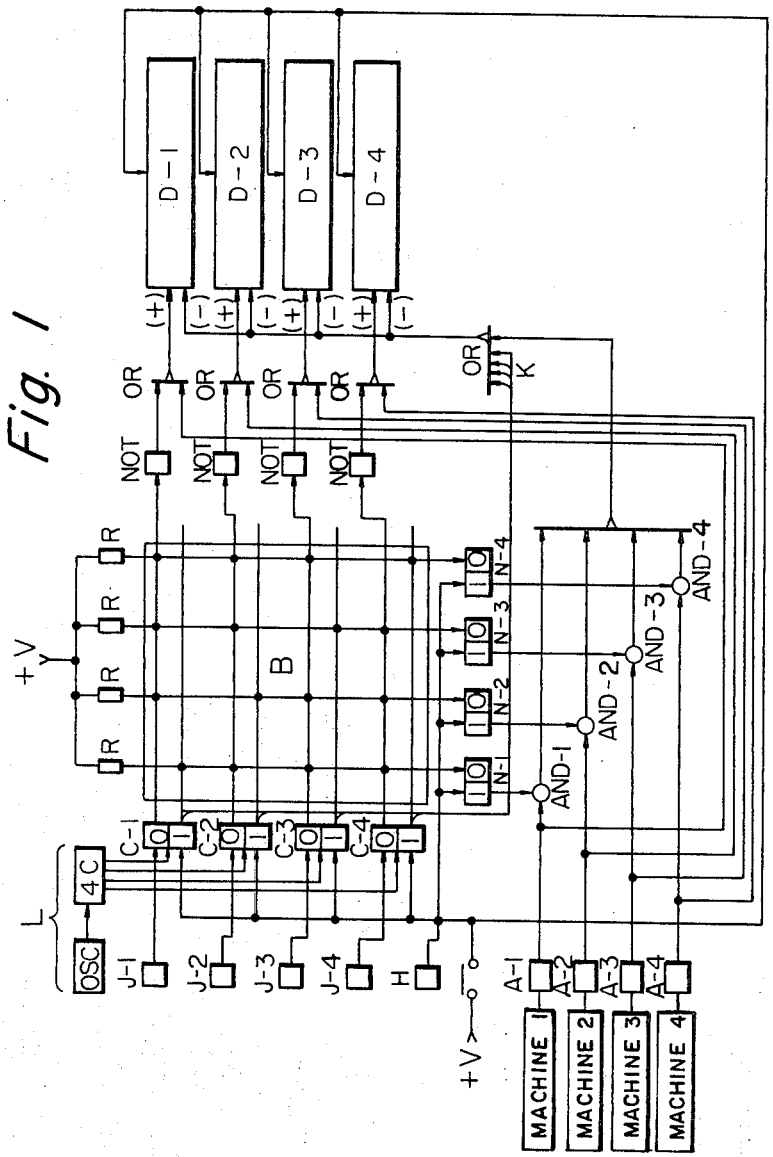

United States Patent [19]
Kuroyanagi

[11] 3,803,464
[45] Apr. 9, 1974

[54] PLURAL MOTOR SYNCHRONIZED OPERATION

[75] Inventor: Moritaka Kuroyanagi, Tokyo, Japan

[73] Assignee: Aida Engineering, Ltd., Kanagawa-ken, Japan

[22] Filed: Nov. 29, 1971

[21] Appl. No.: 202,758

[30] Foreign Application Priority Data
Dec. 21, 1970  Japan.............................. 45-114258

[52] U.S. Cl. ............................. 318/85, 318/603
[51] Int. Cl. .................................. H02p 5/46
[58] Field of Search....................... 318/85, 564, 603

[56] References Cited
UNITED STATES PATENTS

| | | | |
|---|---|---|---|
| 3,064,173 | 11/1962 | Breen et al. | 318/85 X |
| 3,636,364 | 1/1972 | Stempler et al. | 318/85 X |
| 3,549,948 | 12/1970 | Jaeschake | 318/85 X |
| 3,401,321 | 9/1968 | Miki | 318/85 |
| 3,408,549 | 10/1968 | Shimabukuro | 318/85 |
| 3,430,148 | 2/1969 | Miki | 318/85 X |
| 3,673,422 | 6/1972 | Parke | 318/85 X |
| 3,377,924 | 4/1968 | Spencer et al. | 318/564 X |

Primary Examiner—T. E. Lynch
Attorney, Agent, or Firm—Wenderoth, Lind & Ponack

[57] ABSTRACT

A method for insuring synchronous operation of a plurality of machines by detecting the degree of movement of each machine as a pulse count and using the slowest moving machine as the reference, the difference between the pulse count of the reference and the pulse count of each machine being used as the basis for adjusting the speed of each machine respectively.

8 Claims, 2 Drawing Figures

PLURAL MOTOR SYNCHRONIZED OPERATION

This invention relates to a method for insuring synchronous operation of a plurality of machines each of which is provided with a separate power supply.

There has been a growing demand in the field of machine tools and also in connection with industrial machinery in general for a method insuring the synchronous operation of a plurality of machines each having a separate power supply.

Even when all the machines are the same and are produced to the same specifications by the manufacturers they do not have exactly the same characteristics and, further, since even when the characteristics of each machine are the same, the load applied to each machine is usually different, and the operating speed naturally varies in proportion to the load, even though the machines are started simultaneously, a slight difference in phase inevitably results in each cycle of operation. This slight difference accumulates, so, in order to obtain precisely synchronized operation, it is necessary to eliminate the accumulation of the difference in phase by some possible means.

One known method of keeping the machines in phase comprises the steps of detecting the difference in position movement between each machine and a master machine by means of a resolver (angle difference oscillator) or tachometer generator, and controlling the DC current so as to slow down the machine moving faster than the master and to speed up the machine moving slower than the master. However, this known method has the disadvantages that an AC motor cannot be used, larger power is needed than in operation of the machine alone, and a highly complicated control device including an oil hydraulic circuit using a variable speed motor and a servo valve is required which inevitably involves very high expense.

Another known method is practiced on a transfer press line. In this method the clutch is disengaged at the top dead center of each cycle to stop all the machines, thus bringing all the machines into phase, and then restarting the machines. This method is widely used because it is simple in principle and the apparatus is inexpensive, but it has disadvantages in the energy loss is great upon the restarting of the machines and decrease in efficiency due to loss of time is unavoidable.

It is an object of this invention to provide a new and circuit for synchronized operation of a plurality of machines each of which is individually provided with a power supply by using the machine with the least change in position in the degree of progress as a reference.

Another object of the invention is to provide a new method and circuit for synchronized operation of a plurality of machines by the use of a simple control means detecting the machine having the least change in position, and slowing down machines moving faster than said referent machine in progress through such steps, for example, as cutting off the power supply thereto or applying DC brakes therefor.

A further object of the invention is to provide a new method and circuit for synchronized operation of a plurality of machines by cutting off the power supply to all the machines simultaneously when there is a machine which is moving unusually faster than a predetermined limit.

A still further object of the invention is to provide a new pulse circuit for detecting a machine which has made the least change in position from among a plurality of machines operated synchronously.

Accordingly, in the synchronized operation method according to this invention, it is possible to synchronize the operation of all the machines to that of the machine which has had the least change in position by such steps as detecting the change in position of each machine at each cycle as the difference of pulse from the standard which is the least progress, and slowing down the progress of the machines moving faster than the standard by cutting off the supply of electric power to the AC power source concerned for a time proportional to the degree of progress or by applying DC brakes to such machines.

The method of this invention has such advantages that loss of energy and loss of time are greatly reduced since the machine which has made the least progress is continuously operated and, therefore, does not lose any kinetic energy by the application of brake or the cutting off of electric power.

Moreover, since the movement of all the other machines is synchronized to that of the machine which has made the least progress, no complicated control device is required for increasing the operating speed of the machine which has made the least progress.

Further, since it is not necessary to stop the machines periodically to put them in phase, the method of this invention has such other advantages that the machine which has made the least progress is driven at full speed all the time thereby conserving the energy ordinarily lost by the forcible stopping and thus starting of all the machines and decreasing down time and increasing. In addition, the efficiency accuracy can be controlled, and even in a complicated system including machines differing from each other in cycle time this method can be utilized when the number of pulses generated by each machine can be made uniform.

Figure 2:
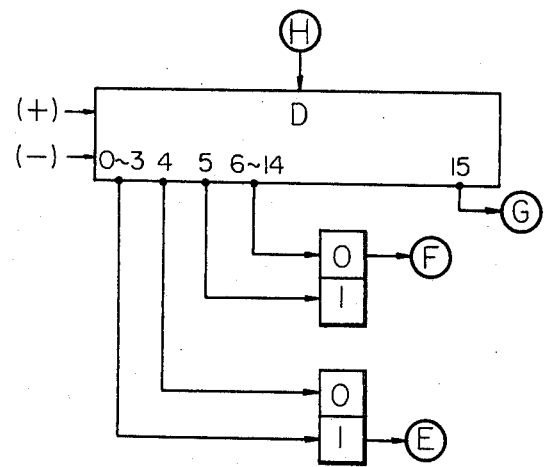

The invention will be better understood from the following description taken in connection with the accompanying drawings in which:

FIG. 1 is a diagrammatical illustration of the synchronized operation system according to this invention; and FIG. 2 is a diagrammatical illustration of the operation of the addition and subtraction counter of FIG. 1.

Referring now to the drawings, there is shown an embodiment wherein three presses and a blank feeder are driven synchronously.

Each press and the blank feeder is provided with a pulse generator A for generating a certain number of pulses on each cycle of rotation of the machine. Therefore, assuming that the generator A produces 360 pulses for each cycle, a pulse corresponds to an angle of rotation of 1°. This assumption shall apply hereinafter.

In the drawing, a numeral prefixed with an "A," (A-1, A-2, A-3, A-4, etc.) indentifies a machine. In other words, in this embodiment, the numerals 1 to 3 indicate respectively the presses 1 to 3 and the numeral 4 indicates that it is attached to the blank feeder.

The prefixes C, D and J similarly identify particular devices or circuits.

B denotes a reference pulse detecting device for taking out the reference pulse generated at a specific point of a cycle of the machines being operated synchronously, for example, at the bottom dead center of the press (in the blank feeder, the position corresponding to the bottom dead center), and for scanning the pulses continuously coming from the machines to detect the latest pulse.

C denotes a pulse gate circuit (for example, a flip-flop) the set side output thereof opens and closes a pulse input gate of the addition and subtraction counter D to be described hereinafter through a NOT element.

D denotes the addition and subtraction counter for performing subtraction, taking the pulse count from the pulse generator A of each machine and subtracting therefrom the reference pulse count from the reference pulse detecting device B, the balance being the output.

E denotes a motor control circuit which, when the output of the addition and subtraction counter D exceeds a certain count number, opens the circuit supplying electricity to the motor so as to decelerate the motor automatically to the rate of progress of the reference motor.

F denotes a brake circuit which, when the output counter of the addition and subtraction counter D exceeds the number of the case described in connection with the motor control circuit E above, applies the DC brake (applies DC current to an AC motor so as to act as an electromagnetic brake) to the machine moving faster than the reference machine to force the machine to slow down.

G denotes a stop circuit for giving instructions to sotp all the machines when the output count of the addition and subtraction counter D indicates an unusually high value.

H denotes a counter reset circuit for clearing the counter at each cycle to get ready for the next count.

J denotes a pulse-gate opening and closing signal circuit for generating signals to operate the pulse gate C.

The circuit denoted by the leteer L is a scanning pulse circuit for scanning the pulse gate circuit with high speed pulse rows from the oscillator OSC to ascertain accuracy upon detection of the latest signal, whereby the latest signal may be detected even when the pulse differential is less than 1.

Now, we will consider the state wherein the subtraction counter D and the pulse gate circuit have been cleared by the start signal from the synchronous operation control circuit (not shown). At this time, since the count number of the addition and subtraction counter of each machine is zero, the switch of the motor control circuit is "on" (1) and the motors of the machines are started simultaneously from predetermined points (for example, bottom dead centers, or points corresponding thereto in the blank feeder). After a cycle, when each press reaches its bottom dead center and the blank feeder reaches the position corresponding to the bottom dead center of the press, the switch of the pulse gate opening and closing signal circuits J-1 to J-4 of each machine is operated to open each of the pulse gate circuits C-1 to C-4 to thereby feed continuous pulses from each pulse generator A-1 to A-4 to each addition and subtraction counter D. At the same time, the reference pulse detecting device B selects the signal denoting the least change in position from the pulse gate circuits C-1 to C-4 as the reference pulse. Since the signals from the pulse gate signal circuits J-1 to J-4 of each machine are always scanned by a high speed pulse train generated by the scanning pulse circuit L, even a minute difference in pulse can be precisely detected and the latest signal can be accurately selected. When the last of all the four pulse gate circuits C-1 to C-4, for example, the pulse gate circuit C-4 is set, N-4 is also set accordingly, whereby prohibition of AND-4 is released, the reference signal gate K is opened to feed the pulses from each pulse generator A-1 to A-4 with said latest pulse as the reference pulse to each addition and subtraction counters D-1 to D-4 as the subtraction pulse. The addition and subtraction counters D perform subtraction immediately after they receive the reference pulses.

The addition and subtraction counter D which is constructed as illustrated in FIG. 2 is adapted to operate various control circuits in response to the count numbers. In other words, when the pulse differential from the latest pulse is not larger than 3, namely when the phase differential is less than 3°, the motor control circuit E is held "on" and the machine continues to operate. When the pulse differential reaches 4, the circuit E is broken to stop electric supply to the motor; however, the machine continues to operate owing to the inertia, though at a slower rate. When the pulse differential exceeds 6, the brake circuit F is operated to apply direct current to the motor of the machine so as to make the motor act as a dynamic brake to thereby forcibly reduce the operational speed of the machine. When the pulse differential reaches 15 for some reason, namely when the phase differential reaches 15°, the stop circuit G is operated to cut off the electric supply to all the machines simultaneously.

While we have described and illustrated a specific embodiment of the invention particularly adapted for use in a transfer press line, it is to be distinctly understood that the scope of the invention is not limited thereto. It is also obvious that the number of the control pulses is not limited to 360 pulses per cycle. Namely, in the present invention, the number of the pulses per cycle can be freely varied to regulate the control accuracy.

We claim:

1. A method for synchronized operation of a system of at least three machines individually provided with a power source, comprising determining the slowest moving machine and detecting the degree of movement of each machine at every predetermined time interval as a pulse difference from the degree of movement of the slowest moving machine, slowing the speed of those machines whose pulse differences are greater than a predetermined limit to thereby synchronize their operation with that of the slowest machine.

2. A method according to claim 1 wherein the step of slowing the speed of the machines comprises cutting off the supply of electricity to the machines whose degree of movement exceeds a first predetermined limit.

3. A method according to claim 1 wherein the step of slowing the speed of the machines comprises applying D.C. brakes to the machines whose degree of movement exceeds a first predetermined limit.

4. A method according to claim 2 further including cutting off the supply of electricity to the whole system to thereby suddenly stop the whole system when the degree of movement of at least one machine exceeds said first predetermined limit and reaches a second predetermined limit.

5. A circuit for the synchronized operation of a plurality of machines comprising:

a pulse gate opening a closing signal circuit provided for each machine to be operated synchronously for generating a pulse signal when the corresponding machine reaches a predetermined point of a cycle;

a pulse generator provided for each machine for generating continuous pulses;

a pulse gate circuit provided for each machine for opening upon receipt of a pulse signal from a corresponding pulse gate opening and closing signal circuit and for closing upon receipt of a signal from a counter reset circuit so as to make the pulses from said pulse generators pass only when said pulse gate circuits are opened;

a reference pulse detecting device for detecting the pulse from the slowest machine by scanning the pulse signals indicating the degree of movement of each machine;

a reference signal gate which is opened by the closing of the last pulse gate for transmitting the latest pulse as the reference pulse;

an addition and subtraction counter for each machine for adding the continuous pulses from said pulse generators fed through said pulse gate circuit and for performing a subtraction operation immediately upon receipt of the reference pulse transmitted from said reference signal gate;

means for reducing the operational speed of the machine to which the addition and subtraction counter belongs when the pulse difference obtained as a result of said subtraction is larger than a first predetermined value; and a reset circuit for returning the entire circuit to the initial state after the operations by the addition and subtraction counters have been completed.

6. A circuit according to claim 5 wherein said means for reducing the operational speed of the machine is a motor control circuit for cutting off the power supply circuit of the motor of said machine.

7. A circuit according to claim 5 wherein said means for reducing the operational speed of the machine is a DC brake.

8. A circuit according to claim 5 wherein said circuit further includes a circuit for cutting off the electric supply to the entire system to suddenly stop the same when a pulse difference obtained by any subtraction operation exceeds a second predetermined value.

* * * * *